(12) United States Patent
Nosella et al.

(10) Patent No.: US 11,999,862 B2
(45) Date of Patent: Jun. 4, 2024

(54) POLYMER FILAMENTS COMPRISING AN AQUEOUS-SOLUBLE IMIDE POLYMER AND USE THEREOF AS A SACRIFICIAL PRINTING MATERIAL IN ADDITIVE MANUFACTURING

(71) Applicant: Xerox Corporation, Norwalk, CT (US)

(72) Inventors: Kimberly D. Nosella, Oakville (CA); Richard Philip Nelson Veregin, Mississauga (CA); Naveen Chopra, Oakville (CA)

(73) Assignee: Xerox Corporation, Norwalk, CT (US)

( * ) Notice: Subject to any disclaimer, the term of this patent is extended or adjusted under 35 U.S.C. 154(b) by 67 days.

(21) Appl. No.: 17/004,861

(22) Filed: Aug. 27, 2020

(65) Prior Publication Data

US 2022/0064462 A1    Mar. 3, 2022

(51) Int. Cl.
| | |
|---|---|
| C09D 11/102 | (2014.01) |
| B29C 64/118 | (2017.01) |
| B29C 64/40 | (2017.01) |
| B33Y 10/00 | (2015.01) |
| B33Y 70/00 | (2020.01) |
| C08G 73/16 | (2006.01) |
| C09D 11/54 | (2014.01) |
| D01F 6/74 | (2006.01) |
| B29K 79/00 | (2006.01) |

(52) U.S. Cl.
CPC .......... *C09D 11/102* (2013.01); *B29C 64/118* (2017.08); *B29C 64/40* (2017.08); *B33Y 10/00* (2014.12); *B33Y 70/00* (2014.12); *C08G 73/16* (2013.01); *C09D 11/54* (2013.01); *D01F 6/74* (2013.01); *B29K 2079/085* (2013.01)

(58) Field of Classification Search
CPC ....... B29C 64/118; B29C 64/40; C08G 73/16; C09D 11/102; C09D 11/54; B33Y 70/00
See application file for complete search history.

(56) References Cited

U.S. PATENT DOCUMENTS

| | | |
|---|---|---|
| 5,348,830 A | 9/1994 | Sacripante et al. |
| 5,348,831 A | 9/1994 | Sacripante et al. |
| 5,411,829 A | 5/1995 | Sacripante et al. |
| 5,427,882 A | 6/1995 | Sacripante et al. |
| 5,601,689 A | 2/1997 | Sacripante et al. |
| 2011/0151158 A1* | 6/2011 | Stall .................... A22C 13/0013 428/34.8 |
| 2016/0271880 A1* | 9/2016 | Bheda .................. B29C 64/209 |
| 2020/0157276 A1* | 5/2020 | Yoshimura ......... C08G 63/6886 |
| 2021/0299946 A1* | 9/2021 | Nakayama ............ B29C 64/295 |

OTHER PUBLICATIONS

Jiang et al Mechanical properties analysis of polyetherimide parts fabricated by fused deposition modeling, High Performance Polymers 2019, vol. 31(1) 97-106, published on Jan. 2019.*
Goh et al (Fabrication of 3D Microfluidic Channels and In-Channel Features Using 3D Printed, Water-Soluble Sacrificial Mold, Macromol. Mater. Eng. 2018, 303, 1700484, Published online: Jan. 23, 2018).*
Kittelberger, S. and Sacripante, G., 2009. Imide based resins. Polymer Preprints (American Chemical Society, Division of Polymer Chemistry), vol. 50, No. 1.

* cited by examiner

*Primary Examiner* — Gregory Listvoyb
(74) *Attorney, Agent, or Firm* — Vorys, Sater, Seymour and Pease LLP

(57) ABSTRACT

When making parts by additive manufacturing, particularly by fused filament fabrication, it is sometimes necessary to include a removable support during part fabrication due to the shape of the part. An overhang, for instance, may be fabricated using a support structure, which is subsequently eliminated following polymer matrix consolidation. Elimination of a removable support following part fabrication may be problematic in some instances. Polymer filaments suitable for forming removable supports during additive manufacturing may comprise at least one imide polymer having at least partial solubility in aqueous fluids. Imide polymers may include, for example, polyimides and polyesterimides. Additive manufacturing processes may comprise forming a supported part by depositing a build material and a removable support comprising an imide polymer, wherein at least a portion of the build material is deposited upon the removable support. An unsupported part may be formed following exposure of the supported part to an aqueous fluid.

10 Claims, 3 Drawing Sheets

POLYMER FILAMENTS COMPRISING AN AQUEOUS-SOLUBLE IMIDE POLYMER AND USE THEREOF AS A SACRIFICIAL PRINTING MATERIAL IN ADDITIVE MANUFACTURING

CROSS-REFERENCE TO RELATED APPLICATIONS

Not applicable.

FIELD

The present disclosure generally relates to additive manufacturing and, more particularly, additive manufacturing processes utilizing a sacrificial printing material, which may be employed to produce complex parts having one or more overhangs or other architectures requiring temporary support during fabrication.

BACKGROUND

Additive manufacturing, also known as three-dimensional (3-D) printing, is a rapidly growing technology area. Although additive manufacturing has traditionally been used for rapid prototyping activities, this technique is being increasingly employed for producing commercial and industrial parts in any number of complex shapes. Additive manufacturing processes operate by layer-by-layer deposition of either 1) a stream of molten printing material or 2) powder particulates of a printing material. The layer-by-layer deposition usually takes place under control of a computer to deposit the printing material in precise locations based upon a digital three-dimensional "blueprint" of the part to be manufactured, with consolidation of the printing material taking place in conjunction with deposition to form the printed part. The printing material forming the body of a printed part may be referred to as a "build material" herein.

Additive manufacturing processes employing a stream of molten printing material for part formation typically utilize a thermoplastic polymer filament as a source of the molten printing material. Such additive manufacturing processes are sometimes referred to as "fused deposition modeling" or "fused filament fabrication" processes. The latter term is used hereinafter.

Additive manufacturing processes employing powder particulates of a printing material oftentimes utilize further heating in selected locations of a particulate bed following printing material deposition to promote coalescence of the powder particulates into a consolidated part. Techniques suitable for promoting consolidation of powder particulates to form a consolidated part include, for example, Powder Bed Fusion (PBF), selective laser sintering (SLS), Electron Beam Melting (EBM), Binder Jetting and Multi-Jet Fusion (MJF).

A wide range of parts having various shapes may be fabricated using both types of additive manufacturing processes. One limitation associated with both types of additive manufacturing processes is that in order for a part to be manufactured "additively," there must be an underlying structure upon which to deposit the printing material for layer-by-layer buildup of the part. The initial layers of a printed part may be deposited upon the print bed (stage) of a three-dimensional printer, and subsequent layers may then be deposited upon the initially deposited layers. In the case of powder deposition processes, the subsequent layers may be supported by underlying layers of a powder bed, which may either be consolidated to form a portion of the part or remain unconsolidated. In contrast, parts manufactured by deposition of a molten printing material, such as by fused filament fabrication, lack a corresponding support structure formed from the printing material. As a printed part grows from the print bed in fused filament fabrication processes, there may be overhangs and similar structures by virtue of the part's shape that are no longer in direct contact with the print bed or with previously deposited layers of the printing material. Parts having overhangs and similar structures may not be directly printed by fused filament fabrication as a result, since the printing material cannot be deposited in free space without the presence of an underlying support.

As a solution to the problem of overhangs and similar structures in need of support during additive manufacturing, particularly during fused filament fabrication processes, a common strategy is to deposit the build material and a sacrificial printing material concurrently, wherein the sacrificial printing material may be formed as a removable support for depositing the build material thereon. The build material and the sacrificial printing material may be deposited from a print head comprising two extruders for providing the build material and the sacrificial printing material separately, or separate print heads may be used much less commonly. Once printing of the part is complete, the sacrificial printing material may be degraded, disintegrated, or dissolved to eliminate or separate the removable support from the printed part to afford an unsupported part. In a non-limiting example, the removable support may be eliminated through contacting the supported part with a solvent in which the sacrificial printing material is soluble or degradable but in which the build material is stable and insoluble. Common sacrificial printing materials capable of being deposited by three-dimensional printing and subsequently removed through solvent contact are fairly limited and include, for example, polyvinyl alcohol and high-impact polystyrene, the former of which is dissolvable in water and the latter of which is dissolvable in an organic solvent, such as D-limonene. Although the foregoing approach for removing the sacrificial printing material is usually effective, the time needed to eliminate the removable support is often much longer than is desirable, and incomplete separation of the removable support from the build material may occur in some cases. In addition, organic solvents used to promote elimination of the removable support may be costly and promote swelling of the build material in some cases.

SUMMARY

The present disclosure provides polymer filaments suitable for use in additive manufacturing, particularly polymer filaments compatible with fused filament fabrication for preparing a removable support. The polymer filaments comprise at least one imide polymer having at least partial solubility in an aqueous fluid.

The present disclosure also provides processes for additive manufacturing of parts having one or more overhang locations. The processes comprise: forming a supported part by depositing a build material and a removable support, at least a portion of the build material being deposited upon the removable support and the removable support comprising at least one imide polymer having solubility in an aqueous fluid; exposing at least a portion of the supported part to an aqueous fluid in which the at least one imide polymer is at least partially soluble; and obtaining an unsupported part after elimination of the removable support from the build material.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1A:
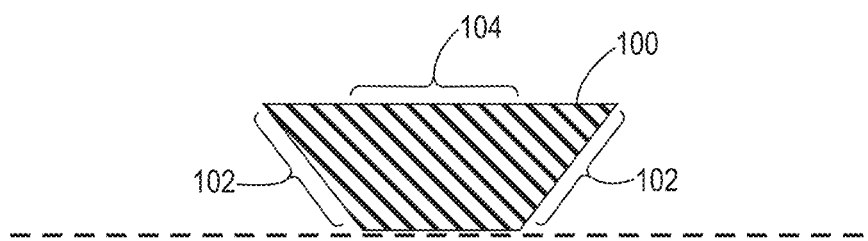
FIG. 1A shows a schematic of an illustrative part having one or more overhangs.

The present disclosure generally relates to additive manufacturing, more particularly additive manufacturing processes utilizing a sacrificial printing material that is at least partially soluble in an aqueous fluid. The sacrificial printing material may be employed to form a removable support when producing complex parts having one or more overhangs, particularly during fused filament fabrication additive manufacturing processes. As discussed above, additive manufacturing processes, such as fused filament fabrication processes, are powerful tools for generating parts in a wide range of complex shapes. In some instances, the shape of a part being generated by additive manufacturing may necessitate use of a sacrificial printing material to provide a removable support for depositing a build material thereon, such as in an overhang region of the part. Elimination of the removable support from a printed part may be slow or incomplete in some instances, which may limit throughput or decrease quality of the part in some cases. Organic solvents may be needed for eliminating removable supports comprising certain types of polymers, which may be problematic in various respects.

As a solution to the slow or incomplete removal of sacrificial printing materials in fused filament fabrication and other additive manufacturing processes, the present disclosure provides polymer filaments comprising aqueous-soluble polymers and additive manufacturing processes conducted therewith, such that elimination of removable supports comprising the aqueous-soluble polymers may be readily realized. Specifically, imide polymers bearing water-solubilizing groups have been found to be extrudable into polymer filaments having glass transition temperatures that are compatible for use in fused filament fabrication processes, particularly wherein the imide polymers may be formed into a support structure to facilitate formation of a part having one or more overhangs. In the disclosure herein, the term "imide polymer" refers to any polymer bearing at least one imide functional group in a repeat unit of the polymer. An imide functional group may be generally represented by Formula 1,

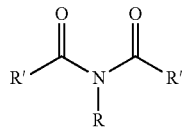

Formula 1 wherein R and R' are independently selected hydrocarbyl groups, and the R' groups may be preferably joined together in a ring to form a cyclic imide. Suitable hydrocarbyl groups include, alkyl, alkylene, aryl, or any combination thereof, as specified further below. Imide polymers suitable for use in the disclosure herein may include, but are not limited to, polyimides, polyesterimides, and polyamideimides, particularly polyimides, polyesterimides or any combination thereof. Such imide polymers may be readily produced by a polycondensation reaction. Suitable imide polymers for use in the disclosure herein are discussed in further detail below and include those described in U.S. Pat. Nos. 5,348,830; 5,348,831; 5,411,829; and 5,601,689, each of which is incorporated herein by reference in its entirety. In addition to their beneficial glass transition temperatures and ability for ready introduction of solubilizing functionality, imide polymers may exhibit good mechanical strength to facilitate formation of polymer filaments suitable for use in additive manufacturing. The good mechanical strength of imide polymers may similarly facilitate formation of structurally stable removable supports during part fabrication. By incorporating solubilizing functionality in the imide polymer, the removable support may be readily eliminated through exposure of a supported part to an aqueous fluid over a short contacting time, particularly an aqueous fluid having an alkaline pH value. Suitable alkaline pH values to promote dissolution of imide polymers include, for example, pH values of about 9 or greater, about 10 or greater, about 11 or greater, about 12 or greater, about 13 or greater, or about 14 or greater. The amount of residual acid groups remaining following polycondensation may dictate the pH value at which a particular imide polymer is soluble, and the additional solubilizing functionality may further facilitate the dissolution of the imide polymer. Suitable contacting times to promote elimination of a removable support comprising an imide polymer may range from about 10 minutes to about 24 hours, or about 1 hour to about 6 hours.

As used herein, the term "water soluble" refers to any material that dissolves, absorbs, swells, or otherwise loses structural integrity in the presence of water. As such, sacrificial materials and removable supports formed according to the disclosure herein may be softened and soluble in water alone, or with the addition of acids or bases, surfactants or other additives that are water dispersible or water soluble. Imide polymers may be fully dissolved or partially dissolved in the disclosure herein. In the case of partial dissolution, a removable support formed from an imide polymer will be considered to be sufficiently water soluble if the removable support is separable from a build material defining the part. Thus, immersing a printed part in an aqueous fluid may cause the removable support to at least partially dissolve in water, or otherwise break down in some manner through which essentially all of the support material breaks away from the build material of the part. In embodiments, a portion of the removable support may be removed from the part without being dissolved in the aqueous fluid.

Suitable aqueous fluids for promoting dissolution according to the disclosure herein can include surfactants, caustic reagents (bases), ionic salts, and any combination thereof. Suitable surfactants may be selected from ionic surfactants and nonionic surfactants. Anionic surfactants, cationic surfactants, and zwitterionic surfactants are encompassed by the term "ionic surfactants." In various embodiments, a surfactant may be utilized so that it is present in an amount of about 0.01 wt. % to 5 wt. % of the aqueous fluid, such as from about 0.75 wt. % to about 4 wt. % or from about 1 wt. % to about 5 wt. %. Even up to about 10 wt. % surfactant may be present in some instances. Thus, a surfactant may be absent or may be present in amounts of from about zero to about 10 pph (parts per hundred), or from about zero to about 4 pph, or from about 4 to about 8 pph, or from about 4 to about 6 pph.

Examples of nonionic surfactants that may be utilized in the disclosure herein include, for example, polyvinyl alcohol, polyacrylic acid, methalose, methyl cellulose, ethyl cellulose, propyl cellulose, hydroxyethyl cellulose, carboxymethyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ available from Rhone-Poulenc, dialkylphenoxy poly(ethyleneoxy)ethanol, and TRITON X-100®. Other examples of suitable nonionic surfactants include a block copolymer of polyethylene oxide and polypropylene oxide, including those commercially available as SYNPERONIC PE/F, such as SYNPERONIC PE/F 108. Still other suitable non-ionic surfactants include trisiloxanes such as $((CH_3)_3SiO_2)_2Si—(CH_3)(CH_2)_3(OCH_2CH_2)_nOH$ with n=4-12, oxyethylated alcohols, $C_{14}(EO)8$, $C_{12}(EO)_5$ and $C_{10}(EO)_4$ (EO=ethylene oxide), and NOVEC™ FC-4430, FC-4432, FC-4434 nonionic, polymeric surfactants from 3M™.

Examples of anionic surfactants that may be utilized in the disclosure herein include sulfates and sulfonates, sodium laureth sulfate (SLES), sodium lauryl sulfate (SLS), ammonium lauryl sulfate (ALS), sodium dodecylsulfate (SDS), sodium dodecylbenzene sulfonate, sodium dodecylnaphthalene sulfate, dialkyl benzenealkyl sulfates and sulfonates, acids such as abeitic acid available from Aldrich, NEOGEN R™, NEOGEN SC™ obtained from Daiichi Kogyo Seiyaku, combinations thereof, and the like. Other suitable anionic surfactants may include, for example, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Still other suitable anionic surfactants include perfluorocarboxylic acids and salts thereof, such as $C_6F_{13}COOLi$, $C_7F_{15}COOH$, $C_7F_{15}COONa$, $C_8F_{17}COOH$, $C_8F_{17}COOLi$, $C_8F_{17}COONa$, $C_8F_{17}COONH_4$, $C_8F_{17}COONH_3C_2H_4OH$, $C_{10}F_{21}COOLi$, $C_{10}F_{21}COONH_4$, $C_{10}F_{21}COONH_3C_2H_4OH$, $C_{12}F_{25}COOLi$, salts of perfluoroalkanesulfonic acid, $C_8F_{17}SO_3Li$, $C_8F_{17}SO_3Na$, $CsF_{17}SO_3NH_4$, $C_8F_{17}SO_3NH_3C_2H_4OH$, and FC-5120 anionic ammonium fluoroalkylsulfonate, specifically nonafluorobutyl[sulfonyl]amino-2-hydroxy-1-propanesulfonic acid, ammonia salt, from 3M™. In addition, highly branched hydrocarbon surfactants, including isostearyl sulfate Na salt, isostearyl sulfate tetrapropylammonium salt, and $(CH_3)_3CCH_2CH(CH_3)CH_2PO_4Na$ may also be selected. Combinations of these surfactants and any of the foregoing anionic surfactants may be utilized in various embodiments.

Examples of cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, the like, and mixtures thereof.

Examples of ionic salts that may be utilized in the disclosure herein include sodium chloride, potassium chloride, sodium bromide, potassium bromide, potassium iodide, magnesium chloride, beryllium chloride, calcium chloride, zinc chloride, ethylenediamine tetracetic acid disodium salt, ethylenediamine tetracetic acid dipotassium salt, ethylenediamine tetracetic acid tetra sodium salt, monosodium phosphate, disodium phosphate, monopotassium phosphate, dipotassium phosphate, sodium fluoride, potassium fluoride, and mixtures thereof. A suitable salt concentration may range from about 1 wt. % to about 10 wt. % of the aqueous fluid.

Examples of caustic reagents that may be selected include sodium bicarbonate, sodium hydrogen carbonate, potassium bicarbonate, sodium carbonate, potassium carbonate, sodium hydroxide, potassium hydroxide, potash, magnesium hydroxide, aluminum hydroxide, lithium hydroxide, lithium bicarbonate, lithium carbonate, ammonia, ammonium hydroxide, ammonium bicarbonate, ammonium carbonate, and any mixture thereof. A suitable amount of caustic reagent (base) may range from about 0.1 wt. % to about 5 wt. % of the aqueous fluid.

The imide polymers disclosed herein are also compatible with many of the thermoplastic polymers used conventionally as build materials in additive manufacturing processes, particularly fused filament fabrication processes. As such, removable supports comprising the imide polymers described herein may be readily eliminated without significantly altering the build material, thereby allowing formation of unsupported parts to be readily realized.

In addition to the ready solubility of imide polymers in aqueous fluids and other advantages provided above, polymer filaments comprising imide polymers and removable supports formed therefrom may be further configured to facilitate dissolution by including an optional gas-forming substance, such as a bicarbonate or carbonate salt, admixed with the imide polymer. Gas bubbles produced during effervescence from the gas-forming substance may provide an expansion force that weakens a removable support and synergistically facilitates its removal by promoting dissolution, disintegration and/or separation of the imide polymer from the build material.

In addition to the ready solubility of imide polymers in aqueous solvents and other advantages provided above, polymer filaments comprising imide polymers and removable supports formed therefrom may be further configured to facilitate dissolution, specifically by including a gas-forming substance admixed with the imide polymer. The gas-forming substance may produce gas when in contact with water or aqueous acid, a process known as effervescence. Gas bubbles produced from the gas-forming substance may provide an expansion force that weakens a removable support and synergistically facilitates its removal by promoting dissolution, disintegration and/or separation of the imide polymer from the build material. Effervescence and imide polymer dissolution may occur under different pH conditions, in which case a first aqueous solvent may promote effervescence and a second aqueous solvent may promote imide polymer dissolution, or vice versa. In promoting elimination of a removable support, the gas bubbles may, as non-limiting examples, increase exfoliation, delamination and/or dissolution of the removable support, separate pieces of the removable support as mechanical integrity decreases, increase porosity of the removable support to promote increased aqueous solvent contact, provide mechanical agitation, or any combination thereof. Effervescence may be promoted before or after dissolution of a majority of the imide polymer when accomplishing the foregoing. Advantageously, the gas-forming substance may be admixed in a polymer filament suitable for use in additive manufacturing without significantly compromising the ability of the polymer filament to form a removable support.

Before discussing various aspects of the present disclosure in further detail, a brief discussion of additive manufacturing processes, particularly fused filament fabrication processes, utilizing a removable support to promote production of complex parts will first be described so that the features of the present disclosure can be better understood. FIG. 1A shows a schematic of illustrative part 100 which may be produced through additive manufacturing using a removable support. As shown in FIG. 1A, part 100 includes overhangs 102, which are not capable of being in direct contact with a print bed during a fused filament fabrication process. The positioning of part 100 with respect to a print bed during fabrication is shown with the dashed line in FIG. 1A; a print bed is not shown in FIG. 1A. Overhangs 102 may not be produced during fused filament fabrication processes without employing a removable support, since there is otherwise no surface upon which to deposit a build material for additively producing an overhang portion of part 100. Non-overhang portion 104 of part 100, in contrast, may be built up directly from the print bed through layer-by-layer deposition of the build material.

Figure 1B:
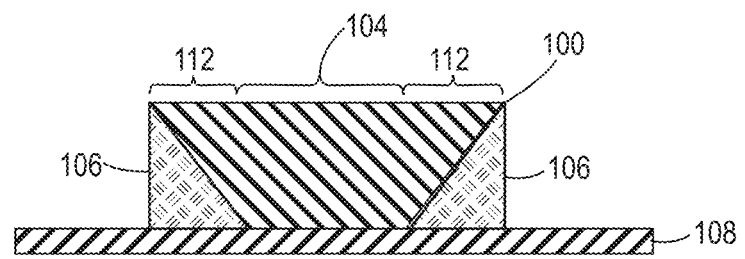
FIG. 1B shows a schematic of an illustrative supported part having one or more overhangs in contact with a removable support.

FIG. 1B shows a schematic of illustrative part 100 with removable supports 106 in contact therewith at overhang portions 112. Removable supports 106 interpose between print bed 108 and overhang portions 112 of part 100. During fabrication of part 100, separate printing materials may be used to fabricate part 100 and removable supports 106, as described further herein. Specifically, in the disclosure herein, removable supports 106 may be formed from an imide polymer as a sacrificial printing material. Non-overhang portion 104 of part 100 may be formed by directly depositing a first printing material (a build material) layer-by-layer upon print bed 108. Concurrently with formation of non-overhang region 104, removable supports 106 may be formed by directly depositing a second printing material (a sacrificial printing material) layer-by-layer upon print bed 108 until deposition of the first printing material is performed to continue forming overhang portions 112 of part 100. Removable supports 106 may be contiguous with part 100, desirably with minimal or no intermixing of the first and second printing materials at an interface in between. Once part 100 has been fabricated in a desired shape, part 100 may be separated from print bed 108 and removable supports 106 may be eliminated to afford an unsupported part, such as that shown in FIG. 1A. Particular details associated with promoting elimination of removable supports 106 are provided hereinbelow.

Figure 2:
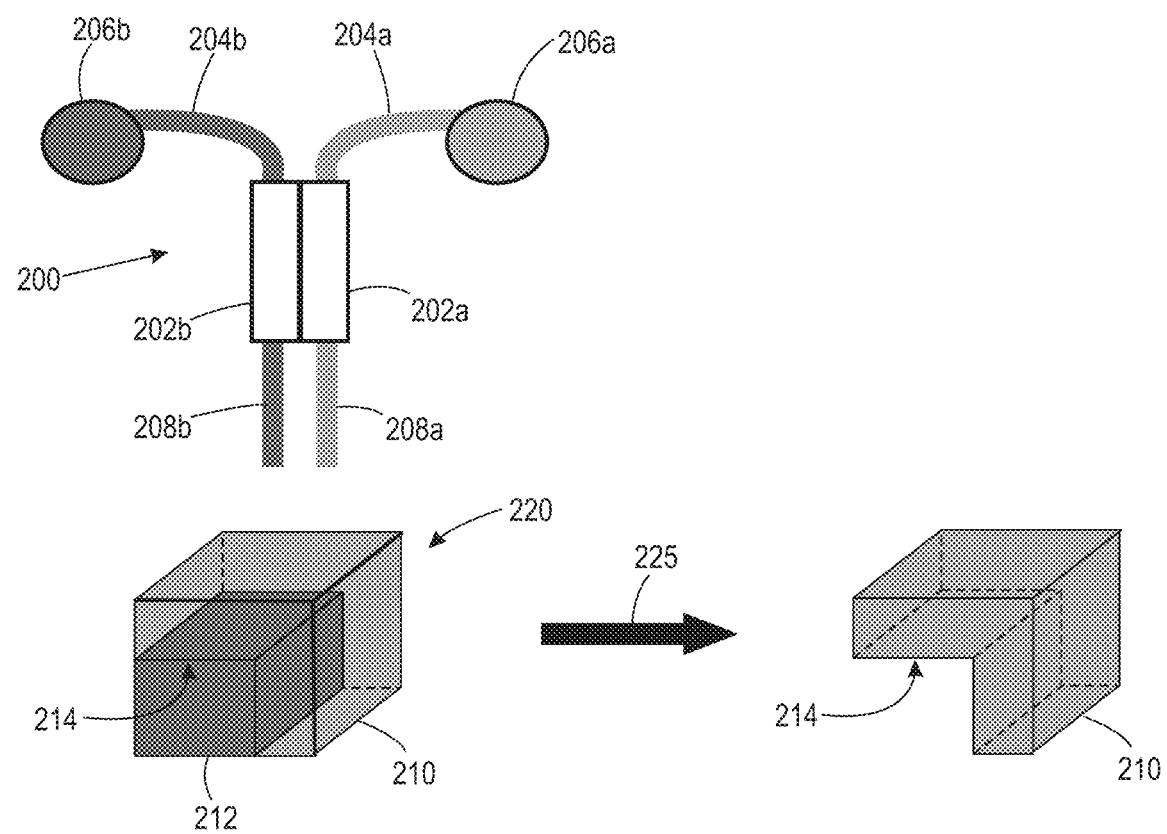
FIG. 2 shows a schematic of an illustrative fused filament fabrication process for producing a part with an overhang.
Figure 3:
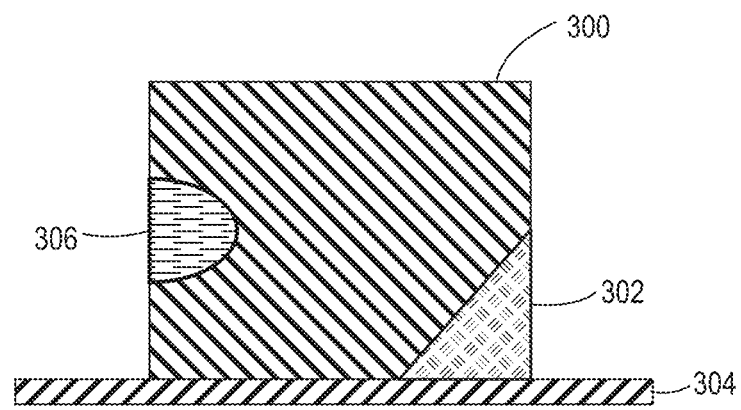
FIG. 3 shows a schematic of an illustrative part having a first removable support interposed between the part and a print bed and a second removable support interposed between two portions of the part.

FIG. 2 shows a schematic of an illustrative fused filament fabrication process for producing a part with an overhang. As shown in FIG. 2, print head 200 includes first extruder 202a and second extruder 202b, which are each configured to receive a filamentous printing material. Specifically, first extruder 202a is configured to receive first filament 204a from first payout reel 206a and provide molten stream 208a of a first printing material, and second extruder 202b is configured to receive second filament 204b from second payout reel 206b and provide molten stream 208b of a second printing material. Both molten streams are initially deposited upon a print bed (not shown in FIG. 2) to promote layer-by-layer growth of supported part 220. The first printing material supplied by first extruder 202a may be a build material used to fabricate part 210, and the second printing material supplied by second extruder 202b may be a sacrificial printing material comprising an imide polymer, which is used to fabricate removable support 212 under overhang 214. In the pail arrangement shown in FIG. 2, removable support 212 is interposed between overhang 214 and the print bed, but it is to be appreciated that in alternatively configured parts, removable support 214 may be interposed between two or more portions of pail 210. FIG. 3, for example, shows illustrative part 300, in which removable support 302 is interposed between an overhang defined between pail 300 and print bed 304, and removable support 306 is interposed between two portions of part 300.

Referring again to FIG. 2, once printing of part 210 and removable support 212 is complete, assembly 220 may be subjected to support removal conditions 225 that result in elimination of removable support 212 (e.g., by dissolution, disintegration, exfoliation, effervescence, or the like) and leave part 210 with overhang 214 unsupported thereon. Support removal conditions 225 may include contact of assembly 220 with an aqueous fluid, particularly an aqueous fluid having an alkaline pH value. The specific alkaline pH value may depend upon the amount of residual carboxylic acid groups present in the imide polymer following polycondensation. Suitable support removal conditions 225 may further include those that result in gas formation within removable support 212.

Imide polymers having at least some solubility in aqueous fluids, such as water at alkaline pH values, may be effectively extruded into polymer filaments above the glass transition temperature (Tg), which may be utilized in additive manufacturing processes, such as fused filament fabrication processes, particularly as a sacrificial printing material. Extrusion systems capable of forming polymer filaments comprising an imide polymer are not believed to be particularly limited. Water containing small amounts of a water-miscible organic co-solvent (e.g., one or more alcohols such as methanol, ethanol or isopropanol, for example) may also be used effectively in the disclosure herein for promoting dissolution of the imide polymers or removable supports formed therefrom. Suitable water-miscible organic solvents may be chosen such that they do not promote dissolution or distortion of the build material.

Dissolution of the imide polymer may occur at room temperature (~25° C.) or at elevated temperatures up to about 95° C. or even about 100° C., for example, such as about 40° C. to about 85° C. or about 40° C. to about 60° C. Dissolution times may range from about 10 minutes to about 24 hours, or from about 1 hour to about 8 hours to promote dissolution of the imide polymer and to facilitate release of a build material from a removable support formed therefrom. A removable support formed from an imide polymer may be effectively removed by dissolving substantially 100% of the imide polymer or a lower amount down to about 25%, or down to about 10%, or down to about 5%, or down to about 1% of the imide polymer comprising a removable support. The only requirement is that the imide polymer undergoes sufficient dissolution, swelling, dispersal, and/or decomposition to promote release and separation of the removable support from a build material. A subsequent wash may be employed after separating a removable support if residual imide polymer remains. Following dissolution, the imide polymer may be recovered from the aqueous fluid and recycled, if desired.

Accordingly, the present disclosure provides polymer filaments suitable for use in additive manufacturing, particularly fused filament fabrication processes in need of formation of a removable support, wherein the polymer filaments comprise at least one imide polymer having at least partial solubility in an aqueous fluid. Suitable imide polymers may include at least one polyimide, at least one polyesterimide, at least one polyamideimide, or any combination thereof. Structural examples of imide polymers having suitable water solubility are provided hereinbelow.

Suitable aqueous fluids for promoting dissolution of the imide polymers disclosed herein may include, but are not limited to, water or alkaline aqueous solutions, optionally further containing a water-miscible organic solvent, including emulsified variants thereof. Suitable alkaline aqueous solutions may have a pH value of about 9 or greater and contain a salt capable of providing a pH value in the foregoing range. Particularly suitable bases for forming alkaline aqueous solutions in the foregoing pH range for promoting imide polymer dissolution may include, for example, alkali metal hydroxides, such as sodium hydroxide or potassium hydroxide; alkaline earth metal hydroxides such as calcium hydroxide or barium hydroxide; ammonium hydroxide; alkali metal carbonates, such as sodium carbonate or potassium carbonate; ammonium carbonate; alkali metal bicarbonates such as sodium bicarbonate or potassium bicarbonate; and alkaline earth metal bicarbonates such as calcium bicarbonate or magnesium bicarbonate. When present, water-miscible organic co-solvents may be included on a volume-volume basis of about 25% or below, or about 10% or below, or about 5% or below, or about 1% or below. Optionally, a surfactant may be present in the aqueous fluid to aid in promoting dissolution of the imide polymer.

In fused filament fabrication processes utilizing the polymer filaments disclosed herein, the print head may contain dual extruders, such that a first polymer filament comprising a build material may be deposited from a first extruder, and a second polymer filament comprising a sacrificial printing material may be deposited from a second extruder to form a removable support for a part formed from the build material. Polymer filaments comprising at least one imide polymer may be utilized as the sacrificial printing material in the disclosure herein. In general, each polymer filament comprising the sacrificial printing material may range from about 0.5 mm to about 5 mm in diameter, particularly about 1.5 mm to about 3.5 mm in diameter. Standard filament diameters for many three-dimensional printers employing fused filament fabrication technology are 1.75 mm or 3.0 mm. It is to be recognized that any suitable polymer filament diameter may be used in accordance with the disclosure herein, provided that the polymer filament is compatible with a user's particular printing system. Similarly, the length and/or color of the polymer filaments is not believed to be particularly limited in the processes disclosed herein. Polymer filaments comprising the build material are similarly not believed to be particularly limited.

In some embodiments, the at least one imide polymer may comprise at least one polyimide having at least partial solubility in an aqueous fluid. Polyimides suitable for use in the disclosure herein may have a structure represented by Formula 2.

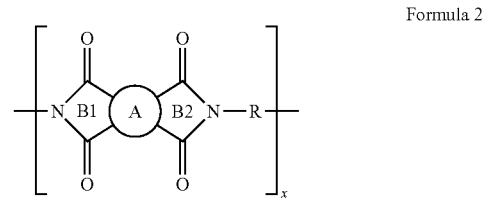

Formula 2

Referring to Formula 2, A is a hydrocarbyl group having 2 pairs of carbonyl groups bonded thereto (4 carbonyl groups total), wherein a first pair of carbonyl groups are disposed on A such that they are located within a five- or six-membered imide ring B1 and a second pair of carbonyl groups are disposed on A such that they are located within a five- or six-membered imide ring B2. The size of imide ring B1 and imide ring B2 may vary independently with respect to one another. Preferably, imide rings B1 and B2 are five-membered imide rings, and A is a cyclic hydrocarbyl group. Each R is independently an alkylene, arylene, bis(phenylene)methane, oxyalkylene, polyoxyalkylene, oxyarylene, polyoxyarylene, oxy(bis(phenylene))methane, or polyoxy(bis(phenylene))methane, group, provided that a sufficient number of R groups in Formula 2 are an oxyalkylene, polyoxyalkylene, oxyarylene, polyoxyarylene, oxy(bis(phenylene))methane, or polyoxy(bis(phenylene))methane group to confer solubility in an aqueous fluid, according to the disclosure herein. That is, at least some occurrences of R in Formula 2 are oxyalkylene, polyoxyalkylene, oxyarylene, polyoxyarylene, oxy(bis(phenylene))methane, or polyoxy(bis(phenylene)methane groups, with the required number of occurrences of R being oxyalkylene, polyoxyalkene, oxyarylene, polyoxyarylene, oxy(bis(phenylene))methane, or polyoxy(bis(phenylene))methane being dependent upon the manner in which the imide polymer becomes solubilized, the required extent of solubility, and whether full dissolution, swelling, or exfoliation is needed to promote removal of the imide polymer. Preferably, at least a portion of the R groups are oxyalkylene or polyoxyalkylene groups. Optionally, any of the selections for R may be crosslinkable as well. Variable x is a positive integer, such as about 5 to about 100,000, or about 5 to about 50,000, or about 5 to about 1000.

Examples of suitable arylene groups include, for instance, 1,2-phenylene, 1,3-phenylene, 1,4-phenylene or any further substituted variant thereof. Examples of bis(phenylene) methane groups include, but are not limited to moieties having the following structures

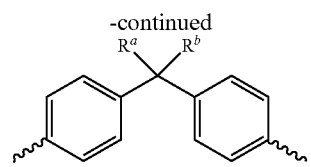

wherein $R^a$ and $R^b$ are independently selected from H or an alkyl group. Preferably $R^a$ and $R^b$ are both H or both methyl groups. The hydrocarbyl backbone of bisphenol A is a representative example of a suitable bis(phenylene)methane group. Alternate spacer groups to $CR^aR^b$ between the phenylene moieties include, but are not limited to, $C(=O)$, O, S, $C(CF_3)_2$, $SO_2$, and the like.

Specific examples of hydrocarbyl spacer A in Formula 2 include, but are not limited to, the following:

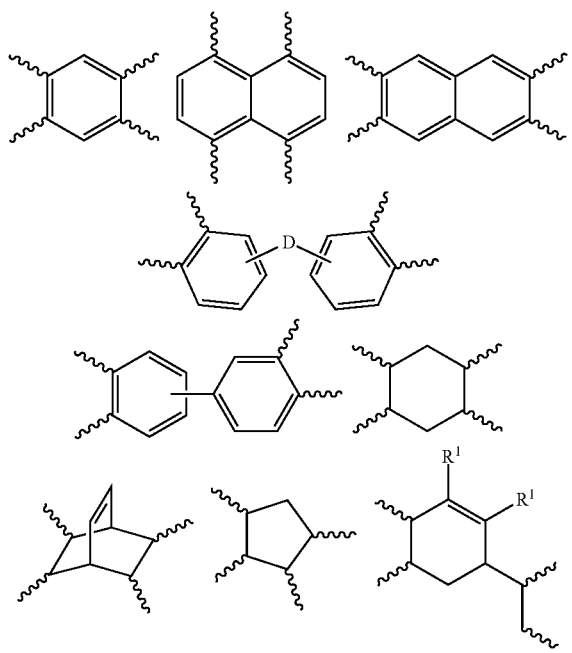

wherein D is a spacer group extending between the two phenyl rings and $R^1$ is H or an alkyl group, such as a methyl group. Suitable examples of spacer group D include, but are not limited to, $C(=O)$, O, S, $C(CF_3)_2$, $CR^cR^d$ ($R^c$ and $R^d$ are independently selected from H and alkyl, preferably both H or both methyl), $SO_2$, and the like. The wavy bonds in the foregoing formulas represent bonding to the carbonyl groups incorporated in the imide rings.

Oxyalkylene groups represented by R in Formula 1 may comprise a dimerized form of ethylene glycol, propylene glycol, or any combination thereof. Similarly, polyoxyalkylene groups represented by R in Formula 1 may comprise a higher oligomer of ethylene glycol, propylene glycol, or any combination thereof, which may be formed by oligomerizing ethylene oxide, propylene oxide, or any combination thereof. The oxyalkylene or polyoxyalkylene group may be interposed between two amino groups in a diamine that undergoes a reaction to form the polyimide, as discussed in further detail hereinbelow. Oxyalkylene or polyoxyalkylene groups in Formula 1 may have a structure presented by Formula 3 below,

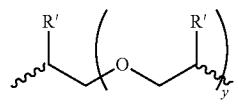

Formula 3 wherein each occurrence of R' is independently H or methyl, and y is an integer ranging from about 1 to about 100, or about 1 to about 50, or about 1 to about 10, or about 1 to about 5, or 1, 2, 3, 4, 5, 6, 7, 8, 9 or 10. The wavy bonds in Formula 3 represent bonding to nitrogen in the polyimide or the diamine used to form the polyimide. Oxyarylene, polyoxyarylene, oxy(bis(phenylene))methane, and polyoxy(bis(phenylene))methane groups in Formula 1 may be likewise defined by Formulas 3A and 3B below, wherein y and R' are specified similarly to those above.

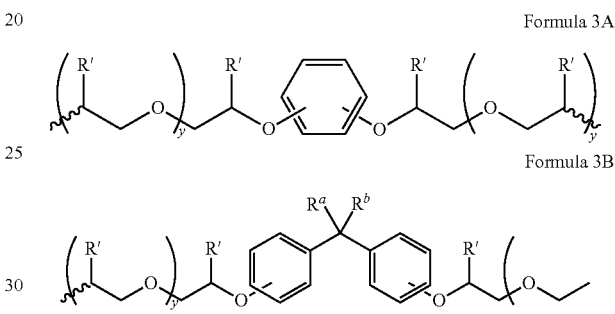

Scheme 1A below shows an illustrative polycondensation reaction for forming a polyimide from a dianhydride and a diamine, wherein the polyimide may exhibit solubility in aqueous fluids and be suitable for use in the disclosure herein.

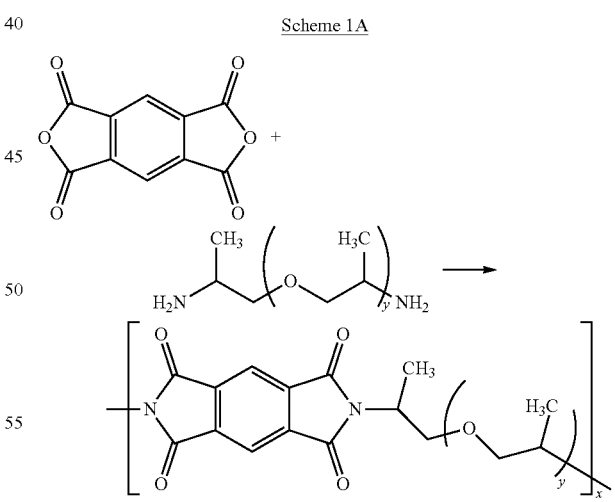

It is to be appreciated that the polyimide formed in accordance with Scheme 1A is exemplary, and other polyimides having related structures may be made by reacting other dianhydrides and/or other diamines with each other, again provided that sufficient solubilizing groups are present to promote solubility in aqueous fluids. For example, Scheme 1B shows the corresponding reaction with an ethoxylated diamine.

Scheme 1B

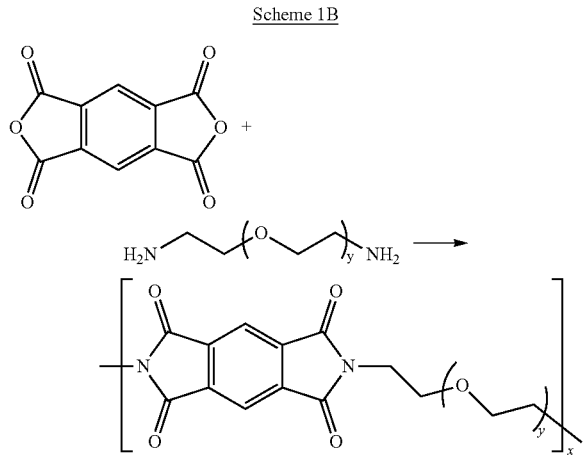

It is also to be appreciated that compounds having similarly disposed diacid groups may likewise undergo polycondensation to produce polyimides under appropriate reaction conditions. Although Schemes 1A and 1B have depicted complete formation of imide groups from both anhydrides, it is to be understood that incomplete condensation may occur in some cases to leave residual acid groups dangling from the polyimide backbone.

Specific examples of dianhydrides or tetracarboxylic acids suitable for use in forming polyimides according to the disclosure herein include, for example, pyromellitic dianhydride, pyromellitic tetracarboxylic acid, bicyclo[2.2.2]oct-7-ene-2,3,5,6-tetracarboxylic acid, bicyclo[2.2.2]oct-7-ene-2,3,5,6-tetracarboxylic dianhydride, 1,2,4,5-cyclohexanetetracarboxylic acid, 1,2,4,5-cyclohexanetetracarboxylic dianhydride, 1,2,3,4-cyclopentanetetracarboxylic acid, 1,2,3,4-cyclopentanetetracarboxylic dianhydride, 1,2,3,4-cyclobutanetetracarboxylic acid, 1,2,3,4-cyclobutanetetracarboxylic dianhydride, 1,4,5,8-naphthalenetetracarboxylic acid, 1,4,5,8-naphthalenetetracarboxylic dianhydride, 3,4,9,10-perylenetetracarboxylic acid, 3,4,9,10-perylenetetracarboxylic dianhydride, 5-(2,5-dioxotetrahydrol)-3-methyl-3-cyclohexene-1,2-dicarboxylic dianhydride, 3,3',4,4'-biphenyltetracarboxylic, 3,3',4,4'-biphenyltetracarboxylic dianhyride, ethylenediaminetetraacetic dianhydride, ethylenediaminetetraacetic acid, benzophenone-3,3',4,4'-tetracarboxylic dianhydride, benzophenone-3,3',4,4'-tetracarboxylic acid, 4,4'-oxydiphthalic anhydride, 4,4'-oxydiphthalic acid, 4,4'-oxydibenzoic dianhydride, 4,4'-oxydibenzoic acid, tetrahydrofuran-2,3,4,5-tetracarboxylic dianhydride, tetrahydrofuran-2,3,4,5-tetracarboxylic acid, and any combination thereof. Mixtures of dianhydrides and tetracarboxylic acids may be present when forming polyimides according to the disclosure herein. In illustrative embodiments, the dianhydride or tetracarboxylic acid may be present in an amount ranging from about 0.45 to about 0.55 mole equivalents per mole of polyimide.

Diamines suitable for use in the disclosure herein include, for example, ethylenediamine, propylenediamine, 1,3-propanediamine, 1,4-butanediamine, 1,5-pentanediamine, 1,6-hexanediamine, cyclopentanediamine, cyclohexanediamine, diaminotrimethylhexane, 1,7-heptanediamine, 1,8-octanediamine, 1,9-nonanediamine, 1,10-decanediamine, and the like. Any of these diamines may be present in combination with a sufficient amount of diamines containing an oxyalkylene group or polyoxyalkylene group, such as those discussed subsequently.

Suitable diamines for use in the disclosure herein containing an oxyalkylene group or polyoxyalkylene group may include those featuring an oligomer of ethylene oxide, propylene oxide, or an ethylene oxide-propylene oxide co-oligomer, wherein the oligomer is terminated with primary amine groups and the molecular weight of the diamine may range from about 100 to about 5000, or about 200 to about 4000. Illustrative examples of diamines containing a polyoxyalkylene group bridging between two amino groups include JEFFAMINES, available from Huntsman Chemicals. Suitable JEFFAMINES include, but are not limited to, JEFFAMINE D-230, JEFFAMINE D-400, JEFFAMINE D-700, JEFFAMINE D-2000, JEFFAMINE D-4000, JEFFAMINE ED-600, JEFFAMINE ED-900, JEFFAMINE ED-2003, JEFFAMINE EDR-148, JEFFAMINE EDR-192.TM, the like, and any combination thereof. In illustrative embodiments, JEFFAMINES or similar diamines containing a polyoxyalkylene group may be present in an amount ranging from about 0.45 to about 0.55 mole equivalents per mole of polyimide.

Alkylene, oxyalkylene, polyoxyalkylene, arylene, oxyarylene, polyoxyarylene, bis(phenylene)methane, oxy(bis(phenylene))methane, or polyoxy(bis(phenylene))methane groups present in the polyimides disclosed herein may be optionally crosslinkable, such that one or more crosslinks may form between adjacent polymer chains. Such crosslinkable groups may contain an additional amine further to the two amines bridged by the alkylene, arylene or bis(phenylene)methane group. That is, suitable amine components for introducing crosslinks into a polyimide may be triamines or polyamines having an even higher number of amino groups. Suitable examples of triamines that may be suitable for use in the disclosure herein include, for example, JEFFAMINE T-403, JEFFAMINE T-3000, JEFFAMINE T-5000, or any combination thereof. When a triamine is used as a crosslinking agent, the amount of triamine may range from about 0.001 mole equivalents to about 0.1 mole equivalents per mole of polyimide.

Polyimides suitable for use in the disclosure herein may exhibit a number average molecular weight (Mn) of about 2500 to about 100,000, as measured by vapor phase osmometry. In addition, the polyimides may have a glass transition temperature of about 45° C. to about 65° C. or about 50° C. to about 75° C., or about 50° C. to about 65° C., or about 60° C. to about 100° C., or about 60° C. to about 150° C., or about 50° C. to about 180° C., as measured by differential scanning calorimetry.

In some embodiments, the at least one imide polymer may comprise at least one polyesterimide formed from a diol and a diamine and having at least partial solubility in an aqueous fluid. Polyesterimides suitable for use in the disclosure herein may have a structure represented by Formula 4.

Formula 4

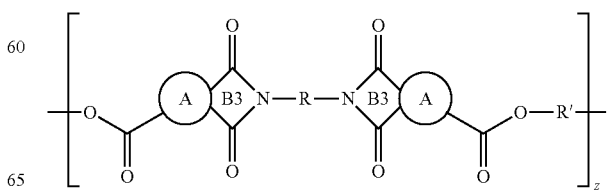

Referring to Formula 4, A is a hydrocarbyl spacer having 3 carbonyl groups bonded thereto, wherein one pair of carbonyl groups is disposed on A such that they are located within a five- or six-membered imide ring B3 and a third carbonyl group is disposed on A remote from imide ring B3, thereby leaving the third carbonyl group available for bonding in an ester linkage. Preferably, imide ring B3 is a five-membered imide ring. Each R is independently an alkylene, arylene, bis(phenylene)methane, oxyalkylene, polyoxyalkylene, oxyarylene, polyoxyarylene, oxy(bis(phenylene))methane, or polyoxy(bis(phenylene))methane. Each R' is independently an alkylene, arylene, bis(phenylene)methane, oxyalkylene, polyoxyalkylene, oxyarylene, polyoxyarylene, oxy(bis(phenylene))methane, or polyoxy(bis(phenylene))methane. A sufficient number of R and/or R' groups in Formula 4 are an oxyalkylene, polyoxyalkylene, oxyarylene, polyoxyarylene, oxy(bis(phenylene))methane or polyoxy(bis(phenylene))methane group to confer at least partial solubility in an aqueous fluid in accordance with the disclosure herein. That is, at least a portion of the R and/or R' groups in Formula 4 areoxyalkylene, polyoxyalkylene, oxyarylene, polyoxyarylene, oxy(bis(phenylene))methane or polyoxy(bis(phenylene))methane groups. Preferably, at least a portion of the R and/or R' groups in Formula 4 are oxyalkylene or polyoxyalkylene groups. Optionally, any of the selections for R and R' may be crosslinkable as well. Variable z is a positive integer, such as about 5 to about 100,000, or about 5 to about 50,000, or about 5 to about 1000.

Specific examples of hydrocarbyl spacer A in Formula 4 include, but are not limited to, the following:

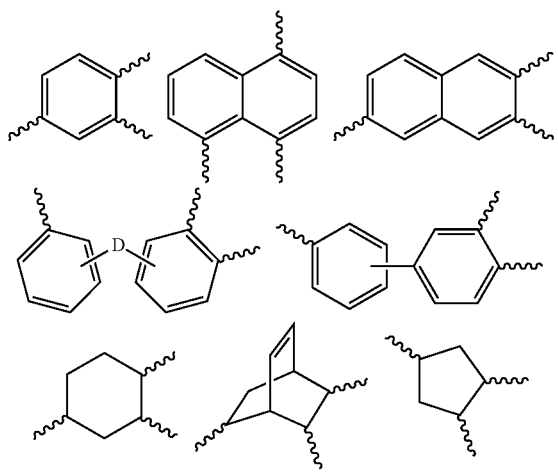

wherein D is a spacer group extending between the two phenyl rings and R' is H or an alkyl group, such as a methyl group. Suitable examples of spacer group D include, but are not limited to, C(=O), O, S, C(CF$_3$)$_2$, CR$^c$R$^d$ (R$^c$ and R$^d$ are independently selected from H and alkyl, preferably both H or both methyl), SO$_2$, and the like. The wavy bonds in the foregoing formulas represent bonding to a carbonyl group, either two carbonyl groups incorporated in an imide ring or a carbonyl group within a carboxylic acid ester.

Specific examples of monocarboxyanhydrides or tricarboxylic acids suitable for use in forming polyesterimides according to the disclosure herein include, but are not limited to, 4-carboxy-1,2-benzenedicarboxylic anhydride, 1,2,4-benzenetricarboxylic acid, 4-carboxy-1,2-cyclohexanedicarboxylic anhydride, 1,2,4-cyclohexanetricarboxylic acid, 1,2,4-cyclopentanetricarboxylic acid, 4-carboxy-1,2-cyclopentanedicarboxylic anhydride, 1,4,5-naphthalenetricarboxylic acid, cis-propene-1,2,3-tricarboxylic anhydride, cis-propene-1,2,3-tricarboxylic acid, and any combination thereof. Mixtures of monocarboxyanhydrides and tricarboxylic acids may be present when forming polyesterimides according to the disclosure herein. In illustrative embodiments, the monocarboxyanhydride or tricarboxylic acid may be present in an amount ranging from about 0.45 to about 0.55 mole equivalents per mole of polyesterimide.

Oxyalkylene groups represented by R in Formula 4 may comprise a dimerized form of ethylene glycol, propylene glycol, or any combination thereof. Similarly, polyoxyalkylene groups represented by R in Formula 4 may comprise a higher oligomer of ethylene glycol, propylene glycol, or any combination thereof, which may be formed by oligomerizing ethylene oxide, propylene oxide, or any combination thereof. The oxyalkylene or polyoxyalkylene group may be interposed between two amino groups in a diamine that undergoes a reaction to form two linked imide moieties in the polyesterimides of the present disclosure, as discussed in further detail below. The oxyalkylene or polyoxyalkylene groups in the R portion of Formula 4 are identical to those shown in Formula 3 and are further specified above. Likewise, oxyarylene, polyoxyarylene, oxy(bis(phenylene))methane and polyoxy(bis(phenylene))methane groups in the R portion of Formula 4 are identical to those shown above in Formulas 3A and 3B. Suitable diamines (or triamines for introducing crosslinking) include any of those specified above as being suitable for use in forming polyimides.

Oxyalkylene groups represented by R' in Formula 4 may comprise a dimerized form of ethylene glycol, propylene glycol, or any combination thereof. Similarly, polyoxyalkylene groups represented by R' in Formula 4 may comprise a higher oligomer of ethylene glycol, propylene glycol, or any combination thereof, which may be formed by oligomerizing ethylene oxide, propylene oxide, or any combination thereof. The oxyalkylene or polyoxyalkylene group may be interposed between two alcohol groups in a diol that undergoes a reaction to form the polyesterimide, as discussed in further detail hereinbelow. Suitable oxyalkylene or polyoxyalkylene groups in the R' portion of Formula 4 may have a structure represented by Formula 5 below, Formula 5

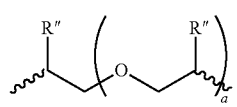

wherein each occurrence of R" is independently H or methyl, and a is an integer ranging from about 1 to about 100, or about 1 to about 50, or about 1 to about 10. In Formula 5, the wavy bonds represent bonding to oxygen in the polyesterimide or the diol used to form the polyesterimide. Oxyarylene, polyoxyarylene, oxy(bis(phenylene))methane, and polyoxy(bis(phenylene))methane groups in Formula 4 may be likewise defined by Formulas 5A and 5B below, wherein a and R" are specified similarly.

Formula 5A

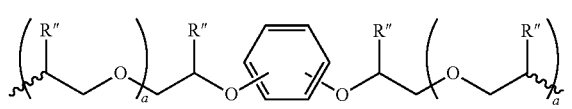

-continued

Formula 5B

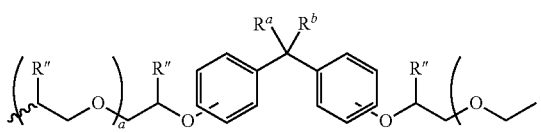

Suitable diols for use in the disclosure herein may include, for example, ethylene glycol; propylene glycol; a reaction product of ethylene glycol and/or propylene glycol with ethylene oxide, propylene oxide; or any combination thereof; or any combination thereof. The reaction product of ethylene glycol and/or propylene glycol with ethylene oxide, propylene oxide, or any combination thereof may be a polyoxyalkylene group, which, if present, may aid in promoting solubility of the polyesterimide in an aqueous fluid. Polyoxyarylene and polyoxy(bis(phenylene)methane groups may similarly be formed through a reaction product of two phenolic hydroxyl groups with ethylene oxide and/or propylene oxide. In the present disclosure oxyalkylene, polyoxyalkylene, oxyarylene, polyoxyarylene, oxy(bis(phenylene))methane and/or polyoxy(bis(phenylene))methane groups may be independently present in either or both the R and R' portions of the polyesterimide. In illustrative embodiments, diols for forming a polyesterimide may be present in an amount ranging from about 0.45 to about 0.55 mole equivalents per mole of polyesterimide.

Triols, higher polyols, and the like may similarly be reacted to form the R' portion of the polyesterimides disclosed herein. When one or more additional alcohol groups are present, crosslinking between adjacent polymer chains may occur, similar to that discussed above for crosslinked amines. When a triol or higher polyol is used as a crosslinking agent, the amount thereof may range from about 0.001 mole equivalents to about 0.1 mole equivalents per mole of polyesterimide.

Scheme 2A below shows an illustrative polycondensation reaction for forming a polyesterimide from a monocarboxyanhydride, a diamine, and a diol, wherein the polyesterimide may exhibit at least partial solubility in aqueous fluids and be suitable for use in the disclosure herein.

Scheme 2A

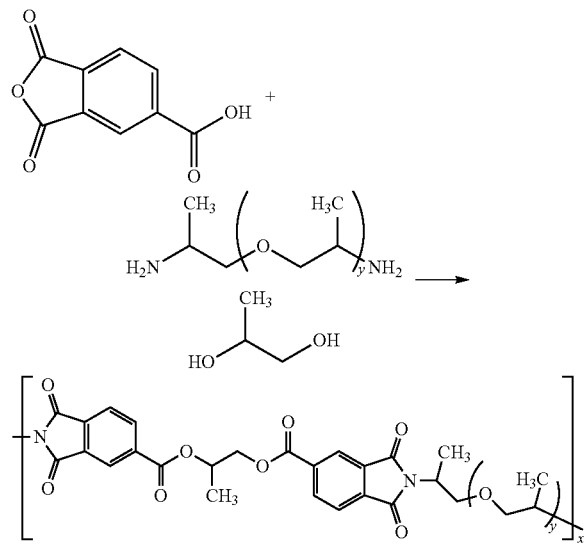

It is to be appreciated that the polyesterimide formed in accordance with Scheme 2A is exemplary, and polyesterimides having related structures may be formed by reacting other monocarboxyanhydrides and/or other diamines and/or other diols with each other, again provided that sufficient solubilizing groups are present to promote solubility in aqueous fluids. For example, Scheme 2B shows the corresponding reaction with ethylene glycol and an ethoxylated diamine.

Scheme 2B

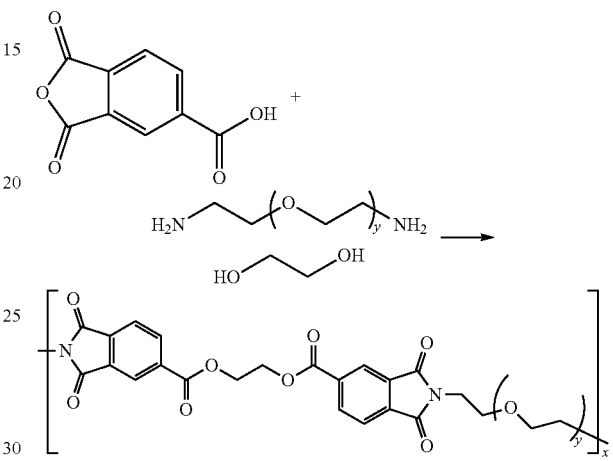

Although a monomeric diol is shown as the diol component in Scheme 2, it is to be appreciated that diols comprising an oxyalkylene or polyoxyalkylene group may undergo a similar reaction to that shown. Although Schemes 2A and 2B have depicted complete formation of imide groups from the anhydride, it is to be understood that incomplete condensation may occur in some cases to leave residual acid groups dangling from the polyesterimide backbone.

In some embodiments, the at least one imide polymer may comprise at least one polyesterimide formed from an amino alcohol. Such polyesterimides having at least partial solubility in aqueous fluids in accordance with the disclosure herein may have a structure represented by Formula 6.

Formula 6

$$\left[ \begin{array}{c} O \\ \| \\ N - B3 - A - C - O - R \\ \| \\ O \end{array} \right]_z$$

Referring to Formula 6, A is a hydrocarbyl spacer having 3 carbonyl groups bonded thereto, wherein one pair of carbonyl groups is disposed on A such that they are located within a five- or six-membered imide ring B3 and a third carbonyl group is disposed on A remote from imide ring B3, thereby leaving the third carbonyl group available for bonding in an ester linkage. Preferably, imide ring B3 is a five-membered imide ring. Each R is independently an alkylene, arylene, bis(phenylene)methane, oxyalkylene, polyoxyalkylene, oxyarylene, polyoxyarylene, oxy(bis(phenylene))methane, or polyoxy(bis(phenylene))methane group. To confer solubility in aqueous fluids, a sufficient number of R groups in Formula 6 are an oxyalkylene, polyoxyalkylene, oxyarylene, polyoxyarylene, oxy(bis(phenylene))methane or polyoxy(bis(phenylene))methane. That is, at least a portion of the R groups in Formula 6 are an oxyalkylene, polyoxyalkylene, oxyarylene, polyoxyarylene, oxy(bis(phenylene))methane or polyoxy(bis(phenylene)) methane. Preferably, at least a portion of the R groups in Formula 6 are oxyalkylene or polyoxyalkylene. Optionally, any of the selections for R may be crosslinkable as well. Variable z is a positive integer, such as about 5 to about 100,000, or about 5 to about 50,000, or about 5 to about 1000.

Hydrocarbyl spacers suitable for forming polyesterimides from a monocarboxyanhydride or a tricarboxylic acid and an amino alcohol include the same monocarboxyanhydrides and tricarboxylic acids discussed above for forming polyesterimides from a diamine and a diol.

Oxyalkylene groups represented by R in Formula 6 may comprise a dimerized form of ethylene glycol, propylene glycol, or any combination thereof. Similarly, polyoxyalkylene groups represented by R in Formula 6 may comprise a higher oligomer of ethylene glycol, propylene glycol, or any combination thereof, which may be formed by oligomerizing ethylene oxide, propylene oxide, or any combination thereof. The oxyalkylene or polyoxyalkylene group may be interposed between an amino group and a hydroxyl group in an amino alcohol that undergoes a reaction to form the polyesterimide, as discussed in further detail hereinbelow. Suitable oxyalkylene or polyoxyalkylene groups in the R portion of Formula 6 may have a structure represented by Formula 7 below, Suitable amino alcohols for use in the disclosure herein include, for example, ethanolamine, propanolamine, a reaction product of the hydroxyl group of ethanolamine and/or propanolamine with ethylene oxide, propylene oxide, or any combination thereof; or any combination thereof. Polyoxyarylene and polyoxy(bis(phenylene))methane groups may similarly be formed through a reaction of a phenolic hydroxyl group of an aminophenol or a phenolic hydroxyl group of an amino-substituted bis(phenylene)methane with ethylene oxide or propylene oxide. In illustrative embodiments, amino alcohols suitable for forming a polyesterimide may be present in an amount ranging from about 0.45 to about 0.55 mole equivalents per mole of polyesterimide.

Amino alcohols containing multiple alcohol groups and/or multiple amino groups may similarly be reacted to form one or more of the R portions in the polyesterimides defined by Formula 6. When multiple alcohol and/or amino groups are present, crosslinking between adjacent polymer chains may occur, similar to that discussed above for crosslinkable amines or crosslinkable diols. When a crosslinkable amino alcohol is present, the amount thereof may range from about 0.001 mole equivalents to about 0.1 mole equivalents per mole of polyesterimide.

Scheme 3A below shows an illustrative polycondensation reaction for forming a polyesterimide from a monocarboxyanhydride and an amino alcohol, wherein the polyesterimide may exhibit at least partial solubility in aqueous fluids and be suitable for use in the disclosure herein.

Formula 7

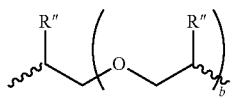

Scheme 3A

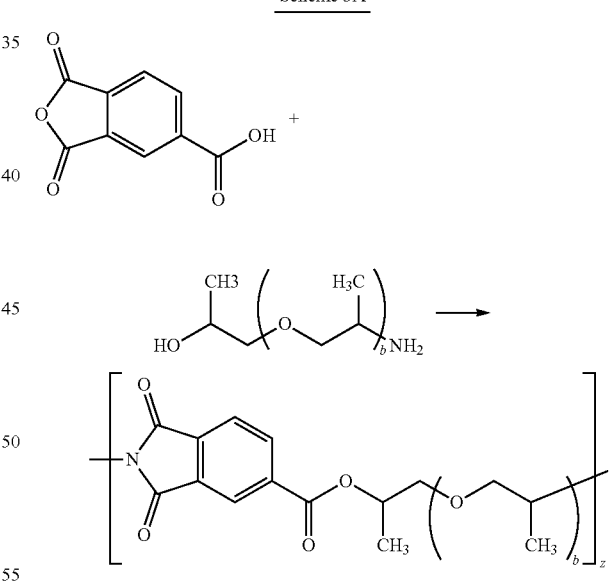

wherein each occurrence of R″ is independently H or methyl, and b is an integer ranging from about 1 to about 100, or about 1 to about 50, or about 1 to about 10. In Formula 7, one of the wavy bonds represents bonding to nitrogen in the polyesterimide or the amino group in the amino alcohol that undergoes a reaction to form the polyesterimide, and the other wavy bond represents bonding to oxygen in the ester group of the polyesterimide or the hydroxyl group in the amino alcohol that undergoes a reaction to form the polyesterimide. Oxyarylene, polyoxyarylene, oxy(bis(phenylene)methane, and polyoxy(bis(phenylene)methane) groups in Formula 6 may be likewise defined by Formulas 7A and 7B below, wherein b and R″ are specified similarly.

Formula 7A

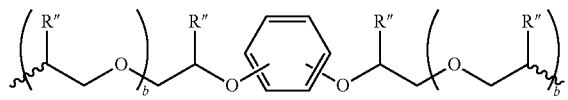

Formula 7B

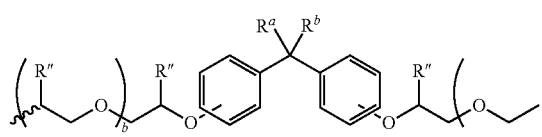

Scheme 3B

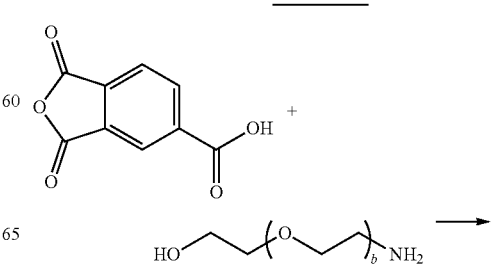

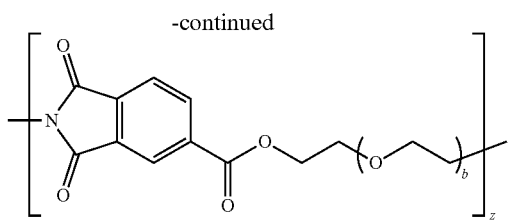

It is to be appreciated that the polyesterimide formed in accordance with Scheme 3A is exemplary, and polyesterimides having related structures may be formed by reacting other monocarboxyanhydrides and/or other amino alcohols with each other, again provided that sufficient solubilizing groups are present to promote at least partial solubility in aqueous fluids. For example, Scheme 3B shows the corresponding reaction with an ethoxylated amino alcohol. Although Schemes 3A and 3B have depicted complete formation of imide groups from the anhydride, it is to be understood that incomplete condensation may occur in some cases to leave residual acid groups dangling from the polyesterimide backbone.

In some embodiments, the at least one imide polymer may comprise at least one polyamideimide, which may be formed by reacting a monocarboxyanhydride with a diamine. Activated carboxylic acid forms of the monocarboxyanhydride may be used as well. Such polyamideimides having at least partial solubility in aqueous fluids in accordance with the disclosure herein may have a structure represented by Formula 8.

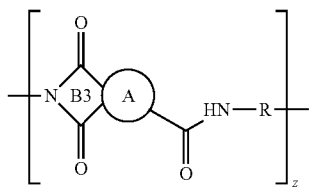

Formula 8

Referring to Formula 8, A is a hydrocarbyl spacer having 3 carbonyl groups bonded thereto, wherein one pair of carbonyl groups is disposed on A such that they are located within a five- or six-membered imide ring B3 and a third carbonyl group is disposed on A remote from imide ring B3, thereby leaving the third carbonyl group available for bonding in an ester linkage. Preferably, imide ring B3 is a five-membered imide ring. Each R is independently an alkylene, arylene, bis(phenylene)methane, oxyalkylene, polyoxyalkylene, oxyarylene, polyoxyarylene, oxy(bis(phenylene))methane, or polyoxy(bis(phenylene))methane group. To confer solubility in aqueous fluids a sufficient number of R groups in Formula 8 are an oxyalkylene, polyoxyalkylene, oxyarylene, polyoxyarylene, oxy(bis(phenylene))methane, or polyoxy(bis(phenylene))methane group. That is, at least a portion of the R groups in Formula 8 are an oxyalkylene, polyoxyalkylene, oxyarylene, polyoxyarylene, oxy(bis(phenylene))methane, or polyoxy(bis (phenylene))methane group. Preferably, at least a portion of the R groups in Formula 8 are oxyalkylene or polyoxyalkylene groups. Optionally, any of the selections for R may be crosslinkable as well. Variable z is a positive integer, such as about 5 to about 100,000, or about 5 to about 50,000, or about 5 to about 1000.

Any of the hydrocarbyl spacers A used for forming polyesterimides may be employed for forming polyamideimides in the disclosure herein. Similarly, any of the diamines used for forming polyimides may be used for forming polyamideimides in the disclosure herein. Scheme 4A below shows an illustrative polycondensation reaction for forming a polyamideimide from a monocarboxyanhydride and a diamine, wherein the polyamideimide may exhibit at least partial solubility in aqueous fluids and be suitable for use in the disclosure herein.

Scheme 4A

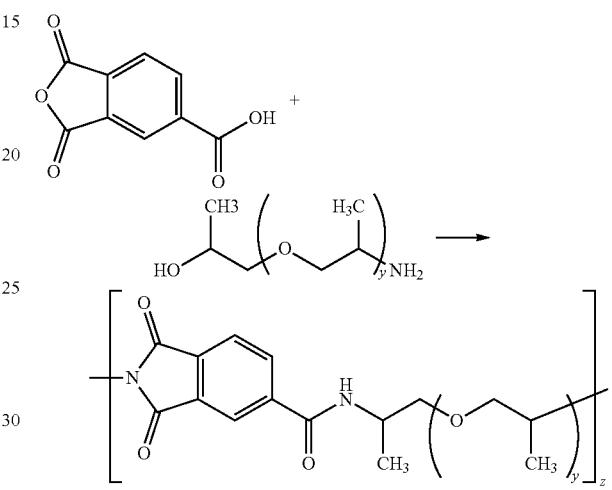

Scheme 4B

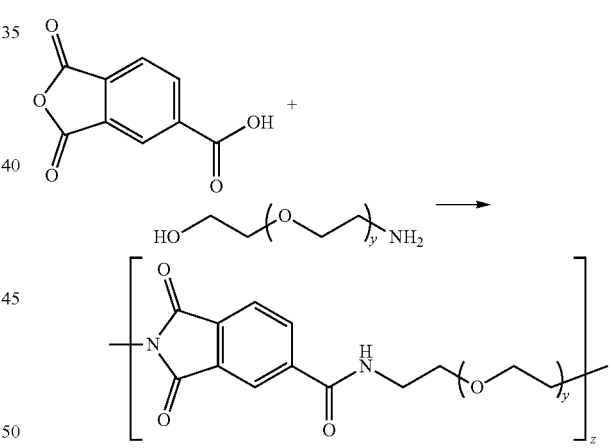

It is to be appreciated that the polyamideimide formed in accordance with Scheme 4A is exemplary, and polyamideimides having related structures may be formed by reacting other monocarboxyanhydrides and/or other diamines with each other, again provided that sufficient solubilizing groups are present to promote solubility in aqueous fluids. For example, Scheme 4B shows the corresponding reaction with an ethoxylated diamine. Although Schemes 4A and 4B have depicted complete formation of imide groups from the anhydride, it is to be understood that incomplete condensation may occur in some cases to leave residual acid groups dangling from the polyamideimide backbone.

The imide polymers used in the present disclosure as a sacrificial printing material may feature melting points or softening temperatures that are sufficient to facilitate extrusion. Suitable imide polymers may exhibit a softening temperature or melting point sufficient to allow extrusion to take place at a temperature ranging from about 50° C. to about 300° C., or about 70° C. to about 275° C., or from about 100° C. to about 200° C., or from about 175° C. to about 250° C. Melting points may be determined using ASTM E794-06 (2018) with a 10° C. ramping and cooling rate, and softening temperatures may be determined using ASTM D6090-17.

Optionally, the polymer filament used to form a removable support during additive manufacturing may comprise a gas-forming substance admixed with the imide polymer, in which the gas-forming substance is activated to form a gas in the presence of water of an acid. Additional details are provided in commonly owned U.S. patent application Ser. No. 17/004,766, now published as U.S. Patent Application Publication 2022/0063187, and entitled "Polymer Filaments Comprising a Gas-Forming Compound and Additive Manufacturing Therewith" filed concurrently herewith and incorporated herein by reference in its entirety. The gas-forming substance may become dispersed throughout a removable support to expedite removal, disintegration, dissolution, and/or separation thereof from the build material of a part. In particular process configurations, the gas-forming substance may become activated to form a gas within the removable support upon contacting an aqueous fluid, such as water or an aqueous acid. In the case of water or an aqueous acid promoting gas formation, the gas generation process may be referred to as effervescence. A solid acid may also be present within the polymer filament or removable support, wherein the solid acid may activate the gas-forming substance to release a gas in the presence of an aqueous fluid. The gas-forming substance and optional solid acid may be present in an amount sufficient to promote effervescence under specified conditions for eliminating a removable support.

Accordingly, the present disclosure also provides processes for forming parts by additive manufacturing, in which a removable support is used to facilitate formation of an overhang or similar feature in the part, and the removable support then undergoes subsequent dissolution and/or separation from the part, optionally under the promotion of in situ gas formation. The part and the removable support may be formed from separate printing materials, a build material and an imide polymer having solubility in an aqueous solvent, respectively. More particularly, such methods may comprise forming a supported part by depositing a build material and a removable support, wherein at least a portion of the build material is deposited upon the removable support and the removable support comprises at least one imide polymer having solubility in an aqueous solvent; exposing at least a portion of the supported part to an aqueous solvent in which the imide polymer is soluble, and obtaining an unsupported part after elimination of the removable support from the build material. Elimination of the removable support from the build material may take place by disintegration, dissolution, separation, or any combination thereof of the removable support while the supported part is exposed to the aqueous solvent. Suitable aqueous solvents for promoting elimination of the removable support are provided above. Optionally, the aqueous solvent may react with a gas-forming substance present in the removable support to promote effervescence, such that the effervescence facilitates elimination of the removable support from the part.

In more particular examples, additive manufacturing processes of the present disclosure may be conducted such that the build material and the removable support are deposited using a fused filament fabrication technique, such as using the dual-extruder print head and printing process illustratively depicted in FIG. 2. Such fused filament fabrication processes may utilize a polymer filament to provide the material for the removable support, in which the polymer filament comprises an imide polymer, as specified in the present disclosure. The build material, examples of which are also provided below, is supplied in filament form to the dual extruder print head in such processes as well.

In the additive manufacturing processes disclosed herein, particularly fused filament fabrication processes, the build material may be formed into a polymer filament suitable for being extruded with a print head, typically with a dual extruder print head also dispensing a sacrificial printing material comprising an imide polymer that is also provided in filament form. Suitable build materials may include those that are typically used in fused filament fabrication processes and are not believed to be particularly limited, provided that the build material does not undergo substantial disintegration, degradation or the like when exposed to the conditions for promoting dissolution of the imide polymer comprising the removable support. Suitable build materials for use in the disclosure herein may include, but are not limited to, acrylonitrile-butadiene-styrene (ABS), high-impact polystyrene (HIPS), polylactic acid (PLA), polyurethanes (PU), polyvinylpyrrolidone-co-polyvinyl acetate (PVP-co-PVA), any copolymer thereof, or any combination thereof. These are among the most common thermoplastic polymer build materials presently employed in additive manufacturing. Other suitable build materials include, for example, polyamides, polyesters, polycarbonates, polyethylene, polypropylene, polyethylene terephthalate, polyetheretherketone, and various copolymers thereof. Polymer composites may also be used as suitable build materials in some instances. Suitable build materials may exhibit a softening temperature or melting point sufficient to allow extrusion thereof at a temperature ranging from about 150° C. to about 300° C., or from about 175° C. to about 275° C., or from about 180° C. to about 250° C., as determined by the ASTM methods referenced herein.

When combined with an imide polymer in a polymer filament, suitable gas-forming substances may comprise substances that are reactive with water or an acid to form a gas, particularly aqueous acids. When the gas-forming substance is reactive with water or an aqueous acid, the gas-forming substance may comprise an effervescent compound. Particularly suitable gas-forming substances that are effervescent may comprise at least one compound that is a carbonate, a bicarbonate, or any combination thereof, wherein the gas generated is carbon dioxide. Suitable carbonates and bicarbonates for promoting gas formation according to the disclosure herein may include, but are not limited to, sodium carbonate, sodium bicarbonate, potassium carbonate, potassium bicarbonate, calcium carbonate, calcium bicarbonate, magnesium carbonate, magnesium bicarbonate, ammonium carbonate, ammonium bicarbonate, or any combination thereof.

When used, the gas-forming substance may be present in the removable support or a polymer filament used in production thereof in an amount sufficient to promote disintegration or like elimination of the removable support when contacting water or an aqueous acid. Suitable amounts may include about 1% or above of the polymer filament by weight. In addition, the gas-forming substance may be present in an amount such that mechanical integrity of the polymer filament is not compromised, and the sacrificial printing material still remains extrudable. When used, suitable amounts of the gas-forming substance for maintaining polymer filament and extrudability may include about 10% or below of the polymer filament by weight. Accordingly, a polymer filament comprising a gas-forming substance and a removable support formed therefrom may comprise about 10% to about 10% of the gas-forming substance by weight. In more particular examples, the polymer filament and/or the removable support may comprise about 1% to about 2% of the gas-forming substance by weight, or 2% to about 4% of the gas-forming substance by weight, or 3% to about 5% of the gas-forming substance by weight, or 4% to about 6% of the gas-forming substance by weight, or 5% to about 7% of the gas-forming substance by weight, or 6% to about 8% of the gas-forming substance by weight, or 7% to about 10% of the gas-forming substance by weight. A solid acid may also be admixed with the imide polymer in the polymer filament or removable support as well.

The acid used to promote gas generation from the gas-forming substance may be an aqueous acid solution. Aqueous mineral acid solutions such as, for example, hydrochloric acid, hydrobromic acid, sulfuric acid, or the like may be used to promote gas generation. Organic acids such as formic acid, acetic acid, propionic acid, methanesulfonic acid, the like, or an aqueous solution thereof, may similarly be used to promote gas generation. The concentration of the acid may be at least sufficient to promote a reaction with the gas-forming substance. If needed, higher acid concentrations may be used to promote at least partial degradation of the sacrificial printing material forming the removable support as well.

If needed to promote further dissolution of the imide polymer, the removable support may be contacted with an alkaline aqueous solution following activation of the gas-forming substance. That is, a first aqueous solution may be employed to promote gas formation (e.g., water, an aqueous mineral acid, or an aqueous organic acid), and a second aqueous solution having an alkaline pH may be employed to complete dissolution of the imide polymer, if needed. Contact with either the first aqueous solution or the second aqueous solution may take place for a length of time sufficient to promote elimination of the removable support from a specified part.

The polymer filament and/or the removable support may further comprise a workability additive as well. In one non-limiting example, glycerol may be a suitable workability additive. Other workability additives that may be optionally present include, but are not limited to, plasticizers such as, for example, phthalates (e.g., dibutyl phthalate) or polyethylene glycol having a sufficiently low molecular weight, such as below about 5000, or below about 2000, or below about 1000, or below about 500. Suitable plasticizers may improve interlayer adhesion during additive manufacturing processes by lowering the glass transition temperature ($T_g$), as described in International Patent Application Publication WO 2017/100447.

Embodiments disclosed herein include:

A. Polymer filaments suitable for forming a removable support during additive manufacturing. The polymer filaments comprise at least one imide polymer having at least partial solubility in an aqueous fluid.

B. Additive manufacturing methods utilizing at least one imide polymer to form a removable support. The methods comprise: forming a supported part by depositing a build material and a removable support, at least a portion of the build material being deposited upon the removable support; wherein the removable support comprises at least one imide polymer having solubility in an aqueous fluid; exposing at least a portion of the supported part to an aqueous fluid in which the at least one imide polymer is at least partially soluble; and obtaining an unsupported part after elimination of the removable support from the build material.

Each of embodiments A and B may have one or more of the following additional elements in any combination:

Element 1: wherein the at least one imide polymer comprises at least one polyimide.

Element 2: wherein the at least one polyimide comprises one or more polyimides having a structure represented by

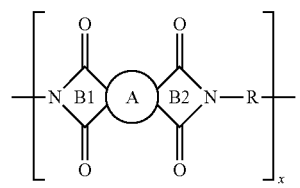

wherein A is a hydrocarbyl group having 2 pairs of carbonyl groups bonded thereto, a first pair of carbonyl groups being located in a five- or six-membered imide ring B1 and a second pair of carbonyl groups being located in a five- or six-membered imide ring B2; wherein R is an alkylene, oxyalkylene, polyoxyalkylene, arylene, oxyarylene, polyoxyarylene, bis(phenylene)methane, oxy(bis(phenylene)) methane, or polyoxy(bis(phenylene))methane group, or a crosslinkable variant thereof, provided that at least some occurrences of R are an oxyalkylene, polyoxyalkylene, oxyarylene, polyoxyarylene, oxy(bis(phenylene))methane, or polyoxy(bis(phenylene))methane group; and wherein x is a positive integer ranging from about 5 to about 100,000.

Element 3: wherein the polyoxyalkylene, polyoxyarylene, or polyoxy(bis(phenylene))methane group comprises an ethylene oxide oligomer, a propylene oxide oligomer, or an ethylene oxide-propylene oxide co-oligomer.

Element 4: wherein the at least one imide polymer comprises at least one polyesterimide formed from a diol and a diamine.

Element 5: wherein the at least one polyesterimide comprises one or more polyesterimides having a structure represented by

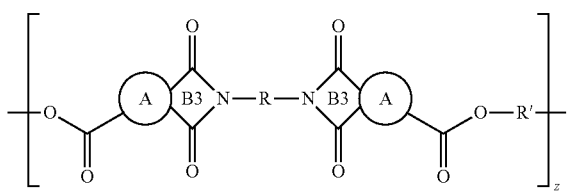

wherein A is a hydrocarbyl group having a pair of carbonyl groups located in a five- or six-membered imide ring B3 and a carbonyl group bound in an ester linkage; wherein R is an alkylene, oxyalkylene, polyoxyalkylene, arylene, oxyarylene, polyoxyarylene, bis(phenylene)methane, oxy (bis(phenylene))methane, or polyoxy(bis(phenylene))methane group, or a crosslinkable variant thereof, and R' is an alkylene, oxyalkylene, polyoxyalkylene, arylene, oxyarylene, polyoxyarylene, bis(phenylene)methane, oxy (bis(phenylene))methane, or polyoxy(bis(phenylene))methane group, or a crosslinkable variant thereof, provided that at least some occurrences of R and/or R' are an oxyalkylene, polyoxyalkylene group, oxyarylene, polyoxyarylene, oxy(bis(phenylene))methane, or polyoxy(bis(phenylene))methane group; and wherein z is a positive integer ranging from about 5 to about 100,000.

Element 6: wherein the aqueous fluid comprises one or more of a base, a surfactant, a salt, and any combination thereof.

Element 7: wherein elimination of the removable support takes place by disintegration, dissolution, separation, effervescence, or any combination thereof of the removable support while the supported part is exposed to the aqueous fluid.

Element 8: wherein the build material and the removable support are deposited using a fused filament fabrication technique, the removable support being deposited from a polymer filament comprising the at least one imide polymer.

Element 9: wherein the build material and the removable support are deposited from a dual extruder print head.

Element 10: wherein the build material is deposited upon the removable support at one or more overhang locations.

Element 11: wherein the polymer filament or removable support further comprises a gas-forming substance admixed with the imide polymer; wherein the gas-forming substance is activated to form a gas in the presence of water or an acid.

Element 12: wherein the gas-forming substance comprises about 1% to about 10% of the polymer filament or removable support by weight.

By way of non-limiting example, exemplary combinations applicable to A and B include, but are not limited to: 1 and 2; 1-3; 4 and 5; 3-5; 1 and 6; 1, 2 and 6; 1-3 and 6; 4 and 6; 4-6; and 3-6, any of which may be in further combination with 11 and/or 12. Additional exemplary combinations applicable to B include any of the foregoing in combination with 7, 8, 9 or 10, any of which may be in further combination with 11 and/or 12. Further exemplary combinations applicable to B include, but are not limited to, 1 and 6; 1 and 7; 1 and 8; 1 and 9; 1 and 10; 4 and 6; 4 and 7; 4 and 8; 4 and 9; 4 and 10; 7 and 8; 7 and 9; 7 and 10; 8 and 9; 8 and 10; 9 and 10; 7-10; and 8-10, any of which may be in further combination with 11 and/or 12.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A polymer filament compatible with fused filament fabrication for preparing a removable support, comprising:

at least one imide polymer having at least partial solubility in an aqueous fluid;

wherein the at least one imide polymer comprises i) at least one polyesterimide formed from a diol and a diamine, the at least one polyesterimide formed from the diol and the diamine having a structure represented by

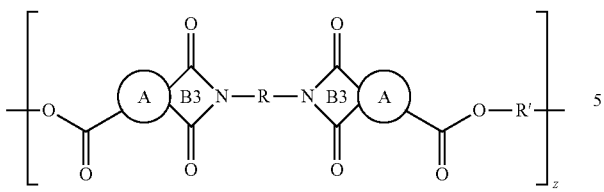

wherein A is a hydrocarbyl group having a pair of carbonyl groups located in a five- or six-membered imide ring B3 and a carbonyl group bound in an ester linkage;

wherein R is an alkylene, oxyalkylene, polyoxyalkylene, arylene, oxyarylene, polyoxyarylene, bis(phenylene)methane, oxy(bis(phenylene))methane, or polyoxy(bis(phenylene))methane group, or a crosslinkable variantthereof, and R' is an alkylene, oxyalkylene, polyoxyalkylene, arylene, oxyarylene, polyoxyarylene, bis(phenylene)methane, oxy(bis(phenylene))methane, or polyoxy(bis(phenylene))methane group, or a crosslinkable variant thereof, provided that at least some occurrences of R and/or R' are an oxyalkylene, polyoxyalkylene, oxyarylene, polyoxyarylene, oxy(bis(phenylene))methane, or polyoxy(bis(phenylene))methane group; and wherein z is a positive integer ranging from about 5 to about 100,000;

ii) at least one polyesterimide formed from an amino alcohol, the at least one polyesterimide formed from the amino alcohol having a structure represented by

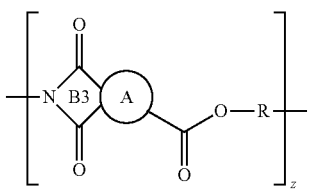

wherein A is a hydrocarbyl group having a pair of carbonyl groups located within a five- or six-membered imide ring B3 and a carbonyl group bound in an ester linkage;

wherein R is an alkylene, oxyalkylene, polyoxyalkylene, arylene, oxyarylene, polyoxyarylene, bis(phenylene)methane, oxy(bis(phenylene))methane, or polyoxy(bis(phenylene))methane group, or a crosslinkable variantthereof, provided that at least some occurrences of R are an oxyalkylene, polyoxyalkylene, oxyarylene, polyoxyarylene, oxy(bis(phenylene))methane, or polyoxy(bis(phenylene))methane group; and wherein z is a positive integer ranging from about 5 to about 100,000; or iii) at least one polyamideimide, the at least one polyamideimide having a structure represented by

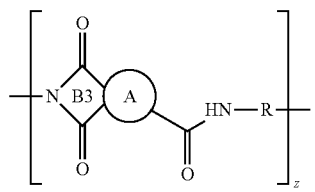

wherein A is a hydrocarbyl group having a pair of carbonyl groups located within a five- or six-membered imide ring B3 and a carbonyl group bound in an amide linkage;

wherein R is an alkylene, oxyalkylene, polyoxyalkylene, arylene, oxyarylene, polyoxyarylene, bis(phenylene)methane, oxy(bis(phenylene))methane, or polyoxy(bis(phenylene))methane group, or a crosslinkable variantthereof, provided that at least some occurrences of R are an oxyalkylene, polyoxyalkylene, oxyarylene, polyoxyarylene, oxy(bis(phenylene))methane, or polyoxy(bis(phenylene))methane group; and wherein z is a positive integer ranging from about 5 to about 100,000; and wherein the polymer filament has a diameter of 0.5 mm to 5.0 mm.

2. The polymer filament of claim 1, wherein the polyoxyalkylene, polyoxyarylene, or polyoxy(bis(phenylene)) methane group comprises an ethylene oxide oligomer, a propylene oxide oligomer, or an ethylene oxide-propylene oxide co-oligomer.

3. The polymer filament of claim 1, wherein the aqueous fluid comprises one or more of a base, a surfactant, a salt, or any combination thereof.

4. An additive manufacturing process comprising:
forming a supported part by depositing a build material and a removable support, at least a portion of the build material being deposited upon the removable support; wherein the removable support is deposited from the polymer filament of claim 1; exposing at least a portion of the supported part to an aqueous fluid in which the at least one imide polymer is at least partially soluble; and obtaining an unsupported part after elimination of the removable support from the build material.

5. The additive manufacturing process of claim 4, wherein elimination of the removable support takes place by disintegration, dissolution, separation, effervescence, or any combination thereof of the removable support while the supported part is exposed to the aqueous fluid.

6. The additive manufacturing process of claim 4, wherein the build material and the removable support are deposited from a dual extruder print head.

7. The additive manufacturing process of claim 4, wherein the build material is deposited upon the removable support at one or more overhang locations.

8. The additive manufacturing process of claim 4, wherein the aqueous fluid comprises one or more of a base, a surfactant, a salt, or any combination thereof.

9. The polymer filament of claim 1, wherein the polymer filament has a diameter of 1.5 mm to 3.5 mm.

10. The polymer filament of claim 1, further comprising:
a gas-forming substance admixed with the imide polymer.

* * * * *